United States Patent
Khamatnurova et al.

(10) Patent No.: US 11,053,425 B2
(45) Date of Patent: Jul. 6, 2021

(54) PICKERING FOAM DRILLING FLUIDS

(71) Applicant: Halliburton Energy Services, Inc., Houston, TX (US)

(72) Inventors: Tatyana V. Khamatnurova, Houston, TX (US); Jody Marie Burks, Spring, TX (US); Ali Alwattari, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 181 days.

(21) Appl. No.: 16/466,525

(22) PCT Filed: Dec. 19, 2017

(86) PCT No.: PCT/US2017/067388
§ 371 (c)(1),
(2) Date: Jun. 4, 2019

(87) PCT Pub. No.: WO2019/125417
PCT Pub. Date: Jun. 27, 2019

(65) Prior Publication Data
US 2020/0270504 A1    Aug. 27, 2020

(51) Int. Cl.
*E21B 21/00* (2006.01)
*C09K 8/38* (2006.01)
(Continued)

(52) U.S. Cl.
CPC .............. *C09K 8/38* (2013.01); *C09K 8/04* (2013.01); *E21B 21/003* (2013.01);
(Continued)

(58) Field of Classification Search
CPC ........... C09K 8/38; C09K 8/04; E21B 21/065; E21B 21/14; E21B 47/00
See application file for complete search history.

(56) References Cited

U.S. PATENT DOCUMENTS

2010/0243248 A1* 9/2010 Golomb .................. C09K 8/58
166/270
2010/0323931 A1* 12/2010 Crawshaw ............. C09K 8/265
507/219
(Continued)

FOREIGN PATENT DOCUMENTS

WO     2014011112      1/2014

OTHER PUBLICATIONS

ISRWO International Search Report and Written Opinion for PCT/US2017/067388 dated Sep. 17, 2017.
(Continued)

*Primary Examiner* — Silvana C Runyan
(74) *Attorney, Agent, or Firm* — Tenley Krueger; C. Tumey Law Group PLLC

(57) ABSTRACT

A method comprising: providing a composition comprising: a base liquid; and solid particles; foaming the composition with a gas to produce a foamed drilling fluid; wherein the foamed drilling fluid is characterized as a Pickering foam wherein at least a portion of the solid particles are dispersed on an interface between the base liquid and the gas to stabilize the Pickering foam; pumping the foamed drilling fluid through a drill string; and extending a wellbore through a subterranean formation.

19 Claims, 2 Drawing Sheets

(51) Int. Cl.
*E21B 21/06* (2006.01)
*E21B 21/14* (2006.01)
*E21B 47/00* (2012.01)
*C09K 8/04* (2006.01)

(52) U.S. Cl.
CPC ............ *E21B 21/065* (2013.01); *E21B 21/14* (2013.01); *E21B 47/00* (2013.01)

(56) References Cited

U.S. PATENT DOCUMENTS

| | | | |
|---|---|---|---|
| 2011/0030948 A1* | 2/2011 | Bismarck | C09K 8/572 166/276 |
| 2016/0122613 A1 | 5/2016 | Zhou et al. | |
| 2016/0122628 A1* | 5/2016 | Babcock | C09K 8/92 166/305.1 |
| 2016/0319188 A1* | 11/2016 | Loiseau | C09K 8/80 |
| 2017/0298268 A1 | 10/2017 | Babcock et al. | |
| 2017/0304810 A1 | 10/2017 | Bernadini et al. | |

OTHER PUBLICATIONS

Lv, Qichao et al., Wall Slipping Behavior of Foam with Nanoparticle-Armored Bubbles and it's Flow Resistance Factor in Cracks, Scientific Reports, Jul. 11, 2017, vol. 7, Article No. 5063, p. 1-14.
Qin, B., Jia, Y., Lu, Y., Li, Y., Wang, D., & Chen, C. (2015). Micro fly-ash particles stabilized Pickering foams and its combustion-retardant characteristics. Fuel, 154, 174-180.

\* cited by examiner

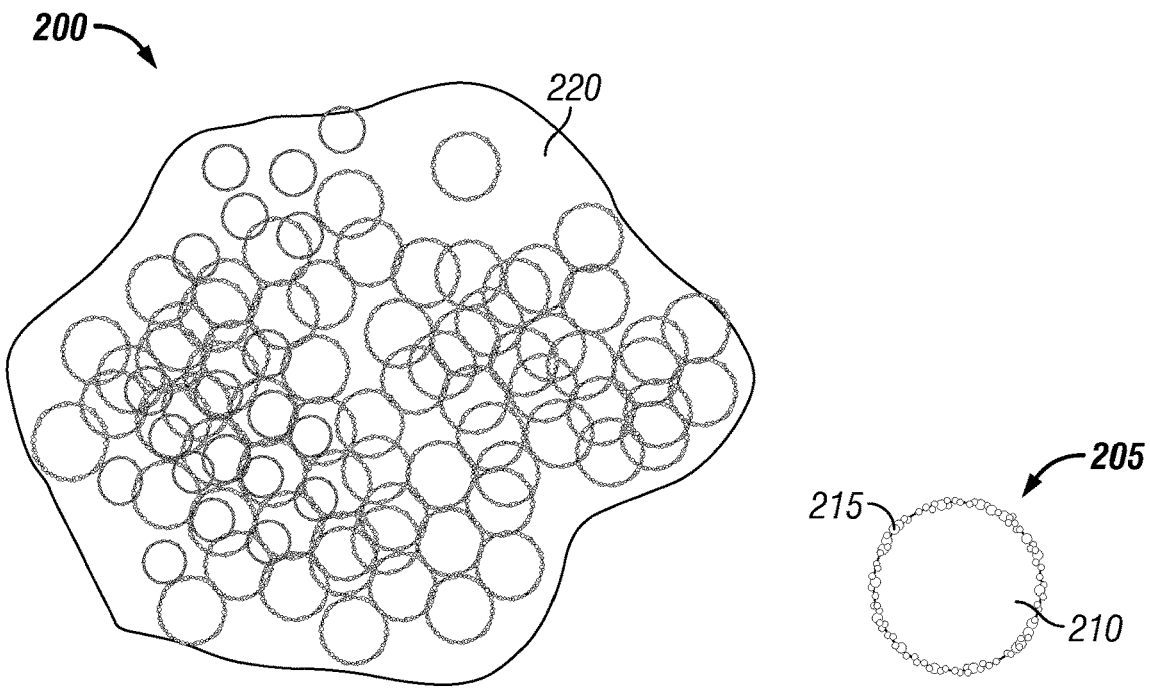
FIG. 2A  FIG. 2B
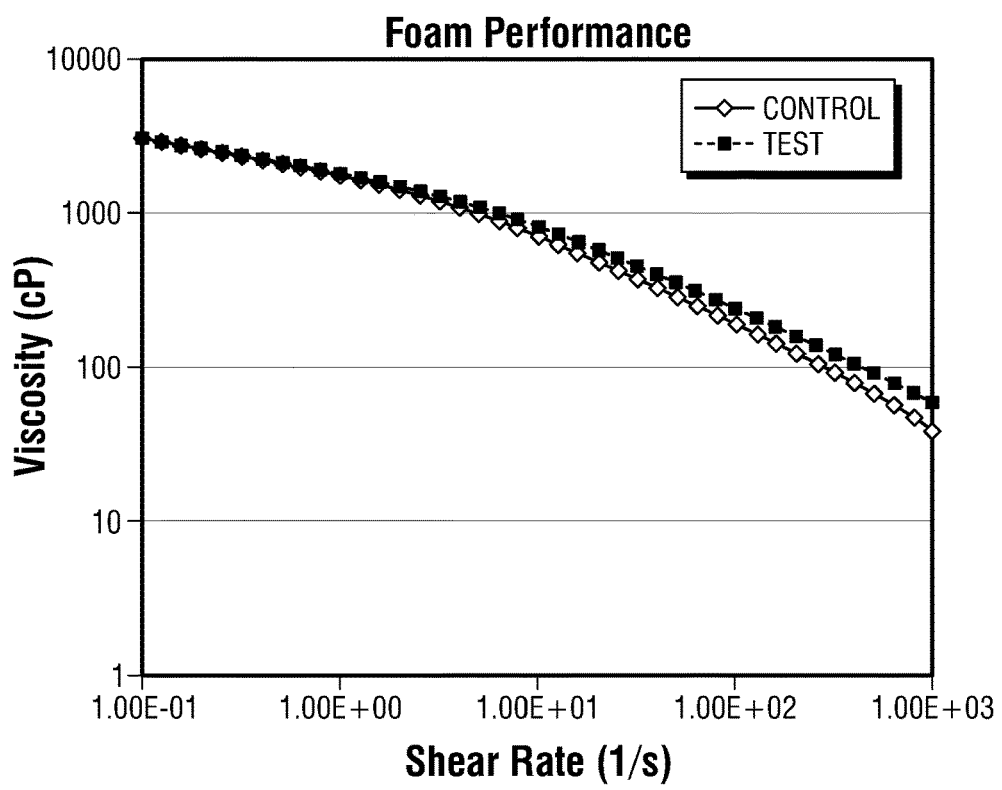
FIG. 3

PICKERING FOAM DRILLING FLUIDS

BACKGROUND

During a well drilling operation, drilling fluids, also referred to as drilling mud, are circulated down the wellbore being drilled. The drilling fluid is generally pumped down the inside of the drillpipe and then passes through the drill bit into the wellbore. The fluid returns to the surface through the annulus, where it can then be recovered, processed, and reused. Drilling fluids perform a number of important duties during a drilling operation, such as lubricating and cooling the drill bit and removing generated rock cuttings. Maintaining sufficiently high viscosities of drilling fluids to provide effective suspension and removal of cuttings, and to provide effective fluid loss control, can be challenging, especially under high temperature conditions that can be experienced downhole. Drilling fluids may be lost during drilling operations due to leak off into the formation.

BRIEF DESCRIPTION OF THE DRAWINGS

These drawings illustrate certain aspects of some examples of the present invention, and should not be used to limit or define the invention.

FIG. 2a is a graphic illustration of a Pickering foam.

FIG. 2b is a detailed illustration of a single Pickering foam bubble.

FIG. 3 is a chart showing the results of a viscometer test of a drilling fluid.

DETAILED DESCRIPTION

Figure 1:
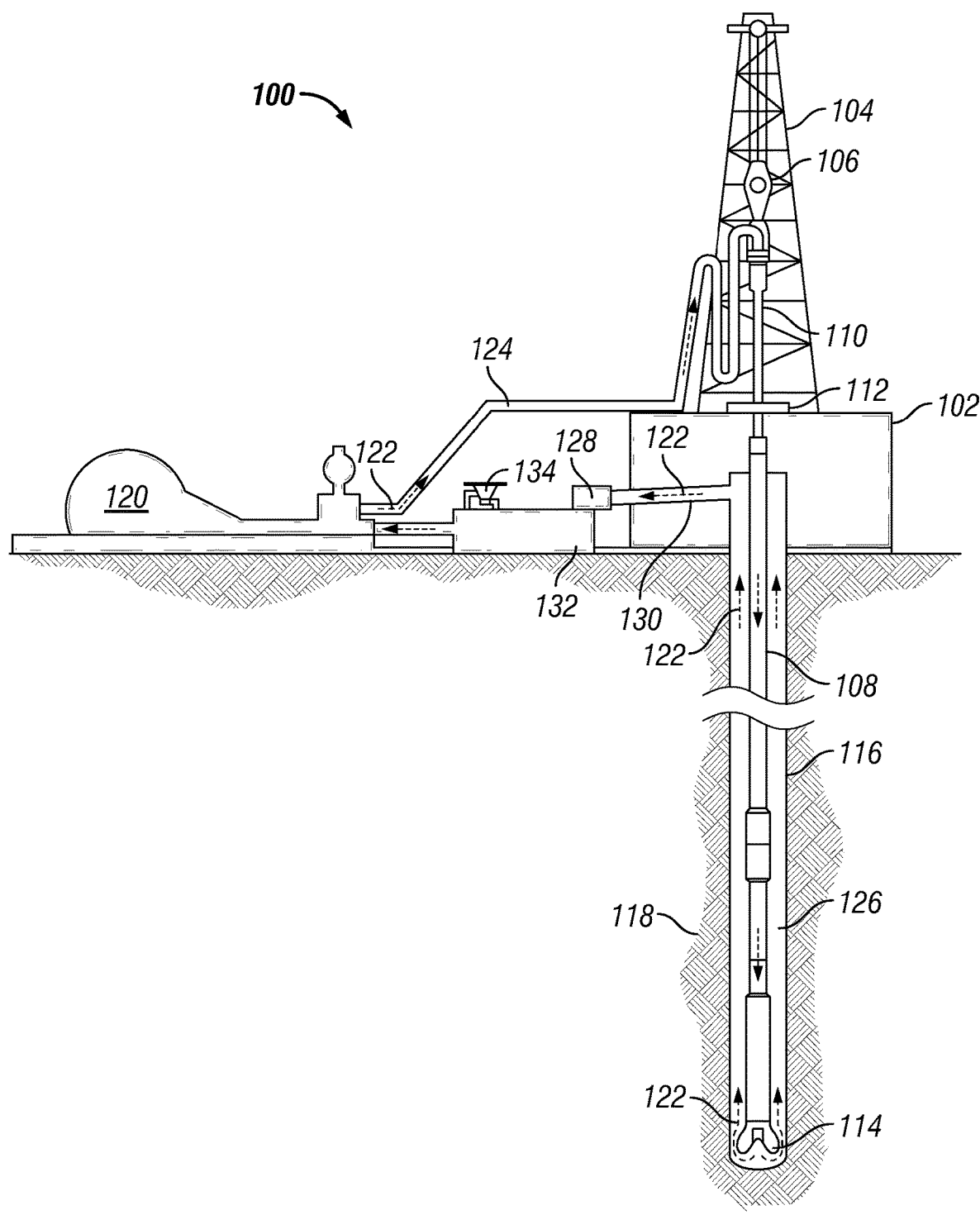
FIG. 1 is a schematic diagram of an example drilling assembly.

As previously discussed, there may be challenges in drilling a wellbore through a subterranean formation due to the drilling fluid leaking off into the formation. Provided are compositions, systems, and methods for drilling a wellbore using a foamed drilling fluid characterized as a Pickering foam. Pickering foams refer to a foam with a continuous aqueous phase with a dispersed gas phase therein and solid particles which are adsorbed on the interface between the gas and liquid phases. The solid particles may have a d50 particle size of about 10 nm to about 100 µm. The solid particles may be substantially dispersed on the interface with at least about 70 wt. % to about 99 wt. % or more of the particles in solution residing on the interface. Alternatively, at a point in a range of about 70 wt. % to about 80 wt. %, at point in a range of about 80 wt. % to about 90 wt. %, or at a point in a range of about 90 wt. % to about 99 wt. %, or wherein about 95 wt. % or greater are residing on the interface.

A foamed drilling fluid characterized as a Pickering foam may display decreased leak off and reduced loss of drilling fluids into formations as compared to foamed drilling fluids which are not characterized as Pickering foams. A foamed drilling fluid that is not characterized as a Pickering foam generally requires a surfactant to generate and maintain a foamed state. An aqueous foam may be a complex fluid comprising several components that keep the foam stable for long enough to be used. In general, aqueous foams are thermodynamically unstable that will separate into the base components over a period of time. Surfactants may be used to promote foam formation as well as provide thermodynamic stability. In higher temperature wellbores, the amount of surfactant required to keep a foam from collapsing may be greater compared to the amount of surfactant required for lower temperature wellbores. In some high temperature wells, the cost of the surfactant required to keep the foam or emulsion stable may become prohibitively high. Surfactant molecules may dynamically adsorb and desorb on a gas liquid interface thereby leading to decreased stability as compared to a Pickering foam. Stability may further decrease with certain conditions such as elevated temperature due to a higher average kinetic energy of the surfactant molecules causing desorption to occur more quickly than at lower temperatures.

Unlike a surfactant, the adsorption of solid particles on a gas liquid interface may be practically irreversible due to the high adsorption energy of the solid particles. The solid particles may eventually desorb under certain conditions where, for example, the average kinetic energy of the solid particles becomes higher than the adsorption energy or by the addition of certain chemicals.

A foamed drilling fluid characterized as a Pickering foam may be capable of being stored for extended periods of time in quiescent storage at room temperature (approx. 70° F. (21° C.)) and atmospheric pressure, for example, about 15 hours or longer, with minimal phase separation. Quiescent storage may be defined as storage without additional mixing during the storage period. Minimal phase separation is defined as less than about 5% by volume breakout of either the continuous or discontinuous phase, or as a combination of the two phases. Breakout may be observed as a stratified layer of fluid that is separate from the bulk foam. In another example, the foamed drilling fluid characterized as a Pickering foam may remain in a fluid state without layer stratification for about one hour or longer, about 5 hours or longer, or about 10 hours or longer in quiescent storage, at for example at about 100° F. (38° C.). A drilling fluid characterized as a Pickering foam may exhibit increased settling time or separation time of as compared to a foamed drilling fluid prepared using only surfactants. As will be discussed in detail below, the foam stability and breakout time may be modulated using certain chemical additives. Additionally, one of ordinary skill would understand that in certain conditions where oil may be present, the stability of the foam may be decreased due to the potential de-foaming properties of the oil.

As previously discussed, the foamed drilling fluid characterized as a Pickering foam may comprise an aqueous liquid, a gas, and solid particles dispersed on an interface between the aqueous liquid and gas. The foamed drilling fluid characterized as a Pickering foam may also further comprise additional additives as discussed below. Before being foamed, the foamed drilling fluid characterized as a Pickering foam may be referred to as a drilling fluid. The drilling fluid may comprise all the components of the foamed drilling fluid characterized as a Pickering foam except for the gas. As will be further discussed below, a drilling fluid comprising the aqueous liquid, solid particles, and any additional additives may be conveyed to a foaming unit wherein a gas is introduced into the drilling fluid to produce a foamed drilling fluid characterized as a Pickering foam.

The aqueous liquid may be from any source provided that it does not contain an excess of compounds that may undesirably affect other components in the drilling fluids. For example, the aqueous liquid may include fresh water or salt water. Salt water generally may include one or more dissolved salts therein and may be saturated or unsaturated as desired for a particular application. Seawater or brines may be suitable for use in some examples. Further, the aqueous liquid may be present in the foamed drilling fluid characterized as a Pickering foam in any amount. Without limitation, the aqueous liquid may be present in the foamed drilling fluid characterized as a Pickering foam in an amount at a point in the range of from about 30 wt. % to about 100 wt. % based on the total weight of the drilling fluid. Alternatively, about at a point in a range of from about 30 wt. % to about 40 wt. %, a point in a range of from about 40 wt. % to about 50 wt. %, a point in a range of from about 50 wt. % to about 60 wt. %, a point in a range of from about 60 wt. % to about 70 wt. %, a point in a range of from about 70 wt. %/o to about 80 wt. %, a point in a range of from about 80 wt. % to about 90 wt. %, or a point in a range of from about 90 wt. % to about 100 wt. %. One of ordinary skill in the art with the benefit of this disclosure will recognize the appropriate amount of aqueous liquid for a chosen application.

As previously described, one or more dissolved salts may also be present in the aqueous liquid. Where used, the dissolved salt may be included in the aqueous liquid for any purpose, including, but not limited to, densifying the aqueous liquid to a chosen density, to provide compatibility with certain formations, to reduce the amount of wellbore erosion in certain formations, or for any. A mixture of one or more dissolved salts and water may be used in some instances. Suitable dissolved salts may include monovalent (group I) and divalent salts (group II). Mixtures of monovalent, divalent, and trivalent salts may also be used. Suitable salts may include, but are not limited to, sodium chloride, sodium bromide, potassium bromide, potassium chloride, potassium formate, cesium formate, lithium chloride, lithium bromide sodium formate, lithium formate, ammonium chloride, organic cation salts such as tetramethyl ammonium chloride, choline chloride, and mixtures thereof among others. The salt may be provided in any amount or concentration such as unsaturated, saturated, or supersaturated. For example, the salt may be provided at a point in a range of about 1 wt. % to about 50 wt. % by based on the total weight of the drilling fluid. Alternatively, about 1 wt. % to about 5 wt. %, about 5 wt. % to about 10 wt. %, about 10 wt. % to about 15 wt. %, about 15 wt. % to about 20 wt. %, about 20 wt. % to about 25 wt. %, about 25 wt. % to about 30 wt. %, about 30 wt % to about 35 wt. %, about 35 wt. % to about 40 wt. %, about 40 wt. % to about 45 wt. %, about 45 wt. % to about 50 wt. %, or about 10 wt. % to about 30 wt. %.

Those of ordinary skill in the art will appreciate that the foamed drilling fluid characterized as a Pickering foam generally should have a density suitable for a particular application. By way of example, the foamed drilling fluid characterized as a Pickering foam may have a density at a point in the range of from about 7 pounds per gallon ("lb/gal") (838.8 kg/m$^3$) to about 20 lb/gal (2397 kg/m$^3$), at a point in the range of from about 8 lb/gal (958.6 kg/m$^3$) to about 12 lb/gal (1438 kg/m$^3$), at a point in the range of from about 12 lb/gal (1438 kg/m$^3$) to about 20 lb/gal (2397 kg/m$^3$). Instances of the foamed drilling fluid characterized as a Pickering foam may include other means to reduce their densities, such as hollow microspheres, low-density elastic beads, or other density-reducing additives known in the art. In some procedures, the density may be reduced after preparing or storing the foamed drilling fluid characterized as a Pickering foam, but prior to placement in a drill string. Those of ordinary skill in the art, with the benefit of this disclosure, will recognize the appropriate density for a particular application.

Foamed drilling fluids characterized as a Pickering foams may further include additional additives including, but not limited to, an aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers. Other additives may include, but are not limited to, clays, shale stabilizers, wetting agents, and weighting agents, among others. Some specific surfactants may include alpha-olefin sulfonates, cocamidopropyl betaine, ethoxylated alcohols, ethoxylated amines, ammonium alkyl ether sulfates, and lauryl hydroxysultaine. One of ordinary skill, with the benefit of this disclosure, should be able to select additional drilling fluid additives for a particular application.

Foamed drilling fluids characterized as a Pickering foams may also comprise a viscosifying polymer. Viscosifying polymers may include any suitable viscosifying polymer such as, without limitation, xanthan gum, welan gum, guar gum, hydroxyethyl cellulose, hydroxy-propyl guar, carboxymethyl-hydroxy-propyl guar, starches and modified polysaccharides, (partially-hydrolyzed polyacrylamide) PHPA, diutan gum, scleroglucan, carboxy-methyl-cellulose, polyanionic cellulose, galactomannan gum, cellulose, starch, chitosan, collagen, gelatin, agarose, chitin, polyaspartic acid, pectin, dextran, gum arabica, alginate, carrageenan, polylactide, poly-caprolactone, polyglycolide, polyhydroxybutyrate, lignin, lignosulfonates, derivatives thereof, and combinations thereof. The viscosifying polymer may be provided in any amount suitable for a particular application. For example, without limitation, the viscosifying polymer may be present in the foamed drilling fluids characterized as a Pickering foams at a point in a range of about 0.1% to about 5 wt. % by based on the total weight of the drilling fluid. Alternatively, at a point in a range of about 0.1 wt. % to about 0.5 wt. %, at a point in a range of about 0.5 wt. % to about 1 wt. %, at a point in a range of about 1 wt. % to about 2 wt. %, at a point in a range of about 2 wt. % to about 3 wt. %, or at a point in a range of about 3 wt. % to about 5 wt. %.

In addition, a weighting agent may be included in the foamed drilling fluids characterized as a Pickering foams. Weighting agents are typically particulate materials with a high-specific gravity. As used herein, the term "high-specific gravity" refers to a material having a specific gravity greater than 2.6. Examples of suitable weighting agents may include, but are not limited to, barite, hematite, ilmentite, manganese tetraoxide, galena, calcium carbonate, and combinations thereof. The weighting agent may be present in the drilling fluid in an amount sufficient for a particular application. For example, the weighting agent may be included in the foamed drilling fluids characterized as a Pickering foams to provide a particular density. Suitable amounts of the weighting agent may include, but are not limited to, at an amount at a point in a range of about 1 vol. % to about 50 vol. % by total volume of the drilling fluid. Alternatively at a point in a range of about 5 vol. % to about 15 vol. %, at a point in a range of about 20 vol. % to about 30 vol. %, at a point in a range of about 30 vol. % to about 40 vol. %, or at a point in a range of about 40 vol. % to about 50. One of ordinary skill in the art with the benefit of this disclosure should recognize the appropriate type and amount of the weighting agent for a chosen application.

As previously discussed, the foamed drilling fluid characterized as a Pickering foam may be created by including solid particles in a foam. Some solid particles suitable for creating the foamed drilling fluid characterized as a Pickering foam may include, but are not limited to, silica including amorphous silica, microcrystalline silica, silica flour, and silica fume, titanium, crystalline nano cellulose, chitin, lignin, lignocellulosic materials, fly ash, and combinations thereof. The solid particles may be surface modified to have a particular surface charge such as anionic or cationic. In particular, the solid particles may be modified by a surface modification agent such as surface modification agent such as a hydrophobically-modified polyamine, polyimine, polyamide, polyester, or polyacrylate. In another method, the surface of the solid particles may be modified by an ion exchange process. When a solid particle with a surface charge is used, a complimentary surfactant may be used in the foamed drilling fluid characterized as a Pickering foam to aid in stabilizing. For instance, an anionic surfactant may be used with a cationic solid particle and a cationic surfactant may be used with an anionic solid particle.

In some applications, the solid particles may be traceable in the wellbore or comprise traceable components. A solid particle that may be traceable may comprise a particle that has magnetic properties, conductive properties, fluorescent properties, or thermal neutron absorbing properties. An example of a sold particle comprising magnetic properties may be iron. A solid particle that has conductive properties may be graphite or iron. A solid particle that may have a thermal neutron absorbing property may be cadmium, boron, gadolinium, iridium, boron carbide, boron nitride, boric acid, boron concentrated glass, zinc borate, borax, gadolinium oxide, gadolinium acetate, gadolinium concentrated glass, and any combination thereof. During or after drilling the wellbore, a detection tool may be inserted into the wellbore to determine the location of the solid particles. For example, a magnetic tool, resistivity tool, neutron tool, or any other tool well known in the art may be inserted in the wellbore to determine the location of the solid particles.

The solid particles may have any size suitable for a particular application. In some instances, the solid particles may have an average diameter at a point in a range of about 10 nm to about 100 μm. Alternatively, at a point in a range of about 10 nm to about 50 nm, at a point in a range of about 50 nm to about 300 nm, at a point in a range of about 300 nm to about 1000 nm, or at a point in a range of about 1000 nm to about 100 μm. The average particle diameter corresponds to d50 values as measured by commercially available particle size analyzers such as those manufactured by Malvern Instruments. Worcestershire. United Kingdom. Other solid particles for producing a foamed drilling fluid characterized as a Pickering foam may include micro proppant and nano proppant. Micro proppant may comprise grains of proppant (e.g., silica) with an average grain diameter of about 1 μm to about 300 μm. Nano proppant may comprise grains of proppant (e.g., silica) with an average diameter of about 1 nm to about 1000 nm. The solid particles may be present in any amount in the drilling fluid suitable for a particular application. For example, the solid particles may be present at a point in a range of about 0.5 pounds per gallon (ppg) (59.9 kg/m$^3$) to about 3 ppg (359.5 kg/m$^3$). Alternatively, at a point in a range of about 0.5 ppg (59.9 kg/m$^3$) to about 1 ppg (120 kg/m$^3$), at a point in a range of about 1 ppg (120 kg/m$^3$) to about 2 ppg (240 kg/m$^3$), or at a point in a range of about 2 ppg (240 kg/m$^3$) to about 3 ppg (359.5 kg/m$^3$).

As discussed above, the foamed drilling fluid characterized as a Pickering foam may comprise a gas entrained in an aqueous liquid. The foamed drilling fluid characterized as a Pickering foam may be a lighter weight composition than a conventional drilling mud so that it that does not exert the same hydrostatic force on formations penetrated by the wellbore as a conventional drilling mud. In addition to being lightweight, a foamed drilling fluid characterized as a Pickering foam may also improve the ability of the drilling fluid to carry certain drill cuttings. Foamed drilling fluids may also be advantageous because they may have low fluid loss properties, thus limiting loss of fluid circulation. Foamed drilling fluids may also be more economical than non-foamed fluids as at least a portion of the drilling fluid is a discontinuous gas phase which allows less of the typically more expensive liquid components to be used.

A foamed drilling fluid characterized as a Pickering foam may be produced at a well site before introduction into a drill string. A drilling fluid comprising the aqueous liquid, solid particles, and any additional additives may be conveyed to a foaming unit wherein a gas is introduced into the drilling fluid to produce a foamed drilling fluid characterized as a Pickering foam. By way of example, the drilling fluid may be foamed immediately prior to use to produce a foamed drilling fluid characterized as a Pickering foam. The drilling fluid may be foamed with a foaming additive and by entraining gas into the drilling fluid. The gas used for foaming the drilling fluid may be any suitable gas for foaming, including, but not limited to: air, nitrogen, and combinations thereof. Generally, the gas should be in an amount sufficient to form the desired drilling fluid characterized as a Pickering foam. Foaming additives may be included in to, for example, facilitate foaming and/or stabilize the resultant foam formed therewith. The solid particles included in the drilling fluid may spontaneously adsorb to a gas liquid interface on gas bubbles entrained in the aqueous liquid in the foaming unit. The adsorption of the solid particles may stabilize the gas liquid interface. The resultant composition of gas entrained in aqueous liquid with solid particles adsorbed on the gas liquid interface is the drilling fluid characterized as a Pickering foam. Additional additives previously described may be in the aqueous phase, the gas phase, or both.

The foaming additive may include a surfactant or combination of surfactants that reduce the surface tension of the liquid phase. By way of example, the foaming additive may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as a alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Drilling fluids characterized as a Pickering foam may be foamed within a foam quality at a point in a range of about 70% to about 99%. Alternatively at a point in a range of about 70% to about 80%, at a point in a range of about 80% to about 90%, or at a point in a range of about 90% to about 99%. As used herein, the term "foam quality" refers to the volume of entrained gas and is defined by the following formula: Foam Quality=(Total Foam Volume-Liquid Volume)/Total Foam Volume.

One of ordinary skill in the art will appreciate that drilling fluids, in addition to carrying drill cuttings out of a borehole, may also possess several advantageous properties. The gel strength of a drilling fluid may determine the ability of the fluid to suspend cuttings during drilling operations. A drilling fluid may suspend the drill cuttings during times when the drilling fluid is not moving such as during drilling rig downtime. Drilling fluids may also maintain borehole stability by exerting hydrostatic head on borehole walls and preventing formation fluids from entering the borehole. Drilling fluids may further provide protection from leak off of drilling fluids into the formation, also known as lost circulation, by forming filter cake on the borehole walls or by sealing off the pores of the formation by placing particles in the pores of the borehole walls.

A foamed drilling fluid characterized as a Pickering foam may have tunable properties such as gel strength, density, lost circulation, and elasticity. Each of the tunable properties may be modulated by adjusting the particle size of the solid particulate used to prepare the foamed drilling fluid characterized as a Pickering foam, the amount of gas entrained in the foamed drilling fluid characterized as a Pickering foam, or the bubble size of the entrained gas. For example, a viscosity of the foamed drilling fluid characterized as a Pickering foam may be modulated by increasing or decreasing the bubble size of the entrained gas. A relatively larger bubble size may lead to a relatively less viscous fluid whereas a relatively smaller bubble size may lead to a relatively more viscous fluid.

The foamed drilling fluid characterized as a Pickering foam may be broken or separated into stratified phases under certain conditions. For example, a change in pH may destabilize the foamed drilling fluid characterized as a Pickering foam and cause the components of the foamed drilling fluid characterized as a Pickering foam to separate into stratified phases. A change in pH may be accomplished by the addition of a pH modification agent that increases or decreases the pH of the foamed drilling fluid characterized as a Pickering foam. In some instances, the pH modification agent may be encapsulated. Another method to break the foamed drilling fluid characterized as a Pickering foam may comprise exposing the foamed drilling fluid characterized as a Pickering foam to an elevated temperature.

A method of extending a wellbore trough a formation, may include circulating a foamed drilling fluid characterized as a Pickering foam through a drill string and bottom hole assembly. The foamed drilling fluid characterized as a Pickering foam may transfer kinetic energy into a mud motor to drive a drill bit on the end of the bottom hole assembly thereby extending the wellbore. The components of the foamed drilling fluid characterized as a Pickering foam may be added at any time, for example while the foamed drilling fluid characterized as a Pickering foam is being prepared or during the cleaning process after the foamed drilling fluid characterized as a Pickering foam has been circulated though the wellbore. In some examples, a density measurement tool may be provided that continuously or discretely monitors the one or more properties of the drilling fluid as it is returned to the surface. Suitable measurement tools may include, but are not limited to, Coriolis meters and others. A user, such as a mud engineer, may make adjustments to the density or other properties of the foamed drilling fluid characterized as a Pickering foam based on the density or other measured properties of the foamed drilling fluid characterized as a Pickering foam returning to the surface. For example, should the density be too high for a particular application, the user may choose to add more gas to reduce the density of the foamed drilling fluid characterized as a Pickering foam. Alternatively, should the density be too low, a user may choose to add less gas. An automatic system may also be used to adjust the density or other properties of the drilling fluid according to a feedback loop and known property limits for select drilled formations. Although only density adjustment have been described, one or ordinary skill will appreciate that any of the other previously mention properties such as gel strength, lost circulation properties, and elasticity may be adjusted.

As will be further described in the figure below, a foamed drilling fluid characterized as a Pickering foam may be generally cleaned and reused throughout a drilling operation. The foamed drilling fluid characterized as a Pickering may be cleaned of solids and drill cuttings and recycled back into the drill string. Additional aqueous fluid or other components of the foamed drilling fluid characterized as a Pickering foam required may be added at any time during the fluid handling process in addition to additional components described above. For example, without limitation, the additional components or aqueous fluid may be added in an inline mixer, to storage tanks including the foamed drilling fluid characterized as a Pickering foam drilling fluid, in the mud pit, or any other point in the fluid handling system.

Drilled solids which become entrained in the foamed drilling fluid characterized as a Pickering foam may be removed by various means which are well known in the art. Shale shakers with select screen mesh sizes are often the most widely-used separation tools. These can be augmented with centrifuges having varying spool/bowl sizes and rotational speeds to further remove fine solids. Separation of solids by these means will allow for additional use of a given fluid, with lower requirements for liquid dilution to keep a constant density.

Although the fluids described herein have been described as a drilling fluid, one of ordinary skill would understand that there may be other applications for the fluids. For example, a fluid in the form of a Pickering foam may have applications in diversion or fracturing. A Pickering foam may provide increased transport for proppant particles in a fracturing application and additionally, since the Pickering foam may comprise nano and micro sized proppant, the nano and micro sized proppant may be placed in fractures. The Pickering foam may also be used as a diverter to direct flow of treatment fluids to areas of lower flow in a subterranean formation.

With reference to FIG. 1, the disclosed foamed drilling fluid characterized as a Pickering foam may affect one or more components or pieces of equipment associated with an exemplary wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. Drilling fluid 122 may comprise a foamed drilling fluid characterized as a Pickering foam. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

The components of the foamed drilling fluid characterized as a Pickering foam may be added via a mixing hopper 134 communicably coupled to or otherwise in fluid communication with the retention pit 132. The mixing hopper 134 may include, but is not limited to, mixers and related mixing equipment known to those skilled in the art. In other instance, however, the foamed drilling fluid characterized as a Pickering foam or components thereof may be added to the drilling fluid 122 at any other location in the drilling assembly 100. In at least one instance, for example, there could be more than one retention pit 132, such as multiple retention pits 132 in series. Moreover, the retention pit 132 may be representative of one or more fluid storage facilities and/or units where the foamed drilling fluid characterized as a Pickering foam or is components may be stored, reconditioned, and/or regulated until added to the drilling fluid 122. In the instance where drilling fluid 122 is foamed, there may exist additional equipment that aids in foaming, including, but not limited to, foaming units, foaming gas supply units, surfactant supply units, blenders, and other equipment well known in the art for foaming a drilling fluid or its components.

As mentioned above, the foamed drilling fluid characterized as a Pickering foam may directly or indirectly affect the components and equipment of the drilling assembly 100. For example, the d foamed drilling fluid characterized as a Pickering foam may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the drilling fluid composition including the Pickering foam.

The foamed drilling fluid characterized as a Pickering foam may directly or indirectly affect the pump 120, which representatively includes any conduits, pipelines, trucks, tubulars, and/or pipes used to fluidically convey the foamed drilling fluid characterized as a Pickering foam, any pumps, compressors, or motors (e.g., topside or downhole) used to drive the foamed drilling fluid characterized as a Pickering foam into motion, any valves or related joints used to regulate the pressure or flow rate of the drilling fluid composition, and any sensors (e.g., pressure, temperature, flow rate, etc.), gauges, and/or combinations thereof, and the like. The foamed drilling fluid characterized as a Pickering foam may also directly or indirectly affect the mixing hopper 134 and the retention pit 132 and their assorted variations.

The foamed drilling fluid characterized as a Pickering foam may also directly or indirectly affect the various downhole equipment and tools that may come into contact with the foamed drilling fluid characterized as a Pickering foam such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The foamed drilling fluid characterized as a Pickering foam described herein may also directly or indirectly affect any downhole heat exchangers, valves and corresponding actuation devices, tool seals, packers and other wellbore isolation devices or components, and the like associated with the wellbore 116. The foamed drilling fluid characterized as a Pickering foam may also directly or indirectly affect the drill bit 114, which may include, but is not limited to, roller cone bits, PDC bits, natural diamond bits, any hole openers, reamers, coring bits, and the like.

While not specifically illustrated herein, the foamed drilling fluid characterized as a Pickering foam may also directly or indirectly affect any transport or delivery equipment used to convey the foamed drilling fluid characterized as a Pickering foam to the drilling assembly 100 such as, for example, any transport vessels, conduits, pipelines, trucks, tubulars, and/or pipes used to fluidically move the foamed drilling fluid characterized as a Pickering foam from one location to another, any pumps, compressors, or motors used to drive the foamed drilling fluid characterized as a Pickering foam into motion, any valves or related joints used to regulate the pressure or flow rate of the foamed drilling fluid characterized as a Pickering foam, and any sensors (e.g., pressure and temperature), gauges, and/or combinations thereof, and the like.

FIGS. 2a and 2b illustrate a Pickering foam 200. Entrained bubble 205 comprises a layer of solid particles 215 that surround gas 210. Entrained bubble 205 is in contact with liquid 220 such that solid particles 215 are on an interface between gas 210 and liquid 200.

Accordingly, systems and methods are provided for providing a stable emulsion drilling fluid. The systems and methods may include any of the various features of the systems and methods disclosed herein, including one or more of the following statements.

Statement 1. A method comprising: providing a composition comprising: a base liquid; and solid particles; foaming the composition with a gas to produce a foamed drilling fluid; wherein the foamed drilling fluid is characterized as a Pickering foam wherein at least a portion of the solid particles are dispersed on an interface between the base liquid and the gas to stabilize the Pickering foam; pumping the foamed drilling fluid through a drill string; and extending a wellbore through a subterranean formation.

Statement 2. The method of statement 1 wherein the base liquid comprises an aqueous fluid.

Statement 3. The method any one of statements 1-2 wherein the solid particles comprise at least one solid particle selected from the group consisting of amorphous silica, microcrystalline silica, silica flour, and silica fume, titanium, crystalline nano cellulose, chitin, lignin, lignocellulosic materials, fly ash, and combinations thereof.

Statement 4. The method of any one of statements 1-3 wherein the solid particles have a d50 particle size ranging from about 10 nm to about 100 μm, wherein at least 95% of the solid particles are dispersed on the interface.

Statement 5. The method of any one of statements 1-4 wherein the solid particles are present in an amount ranging from about 0.05 ppg to about 3 ppg based on a total volume of the base liquid.

Statement 6. The method of any one of statements 1-5 wherein the gas is selected from the group consisting of air, nitrogen, and combinations thereof.

Statement 7. The method of any one of statements 1-6 wherein the foamed drilling fluid has a foam quality at a point in a range of about 90% to about 99%.

Statement 8. The method of any one of statements 1-7 wherein the foamed drilling fluid has less than about 5% by volume breakout in quiescent storage at atmospheric pressure and 21° C. for a period of about 1 day or longer.

Statement 9. The method of any one of statements 1-8 wherein the foamed drilling fluid has a density of about 838.8 kg/m$^3$ to about 2397 kg/m$^3$.

Statement 10. A method comprising: mixing a drilling fluid in a mixer, wherein the drilling fluid comprises: a base liquid; and solid particles; wherein the solid particles have a d50 particle size ranging from about 10 μm to about 100 μm; conveying the drilling fluid to a foaming unit; introducing a gas into the drilling fluid to produce a foamed drilling fluid, wherein the foamed drilling fluid is characterized as a Pickering foam wherein at least about 95 wt. % or more of the solid particles are dispersed on an interface between the base liquid the gas; circulating the foamed drilling fluid though a drill string and annulus; and extending a wellbore through a subterranean formation Statement 11. The method of statement 10 wherein the base liquid comprises an aqueous fluid.

Statement 12. The method of any one of statements 10-11 wherein the solid particles comprise at least one solid particle selected from the group consisting of amorphous silica, microcrystalline silica, silica flour, and silica fume, titanium, crystalline nano cellulose, chitin, lignin, lignocellulosic materials, fly ash, and combinations thereof.

Statement 13. The method of any one of statements 10-12 wherein the solid particles are present in an amount ranging from about 0.05 ppg to about 3 ppg based on a total volume of the base liquid.

Statement 14. The method of any one of statements 10-13 wherein the gas is selected from the group consisting of air, nitrogen, and combinations thereof.

Statement 15. The method of any one of statements 10-14 further comprising: recovering the foamed drilling fluid from the annulus, wherein the foamed drilling fluid recovered from the annulus comprises well cuttings; and removing at least a portion of the well cuttings from the foamed drilling fluid recovered from the annulus to produce a cleaned foamed drilling fluid.

Statement 16. The method of any one of statements 10-15 further comprising monitoring at least one property of the foamed drilling fluid recovered from the annulus wherein the at least one property is gel strength, density, bubble size, foam elasticity, and combinations thereof.

Statement 17. The method of any one of statements 10-16 further comprising adjusting the at least one property in response to the step of monitoring prior to the step of circulating.

Statement 18. A drilling fluid comprising: a base liquid; a gas entrained in the base liquid; and solid particles; wherein the drilling fluid is a foamed drilling fluid in the form of a Pickering foam having a foam quality ranging from about 90% to about 99%, wherein at least a portion of the solid particles are dispersed on an interface between the base liquid and the gas to stabilize the Pickering foam.

Statement 19. The drilling fluid of statement 18 wherein the solid particles comprise at least one solid particle selected from the group consisting of amorphous silica, microcrystalline silica, silica flour, and silica fume, titanium, crystalline nano cellulose, chitin, lignin, lignocellulosic materials, fly ash, and combinations thereof.

Statement 20. The drilling fluid of any one of statements 18-19 wherein the solid particles are present in an amount ranging from about 0.05 ppg to about 3 ppg based on a total volume of the base liquid, and wherein at least 95% of the solid particles are dispersed on the interface.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the disclosure, the following examples of certain aspects of some embodiments are given. In no way should the following examples be read to limit, or define, the entire scope of the embodiments.

Example 1

A gelled fluid was prepared using Houston tap water and 20 pound per gallon (2397 kg/m$^3$) loading of guar gum. A first control mixture was prepared by adding 100 mL of the gelled fluid to a blender along with 1 mL of amphoteric surfactant. A second Pickering foam mixture was prepared by adding 100 mL of the gelled fluid to a blender along with 1 mL of amphoteric surfactant and 1 gram of 200 mesh micro proppant. The mixtures were agitated at 5000 RPM to create foams. The foams were separately placed into 500 mL graduated cylinders and the volume of foam was measured. Thereafter, 50 mL of the gelled fluid was added to each graduated cylinder and a timer was stated. The volume of foam displaced for each sample was measured. The results are shown in Table 1. It was observed that the Pickering foam comprising the micro proppant outperformed the control test by displacing the volume slower thereby exhibiting higher foam stability.

TABLE 1

| | Volume Displaced (mL) | |
|---|---|---|
| Time (min) | Control | Pickering Foam |
| 26 | 38 | 30 |
| 28 | 40 | 38 |
| 34 | 50 | 47 |

Example 2

A viscometer test was run to determine the dependence of viscosity on shear rate. The control mixture and the Pickering foam mixture from Example 1 were tested in a viscometer. The results are shown in FIG. 3. It was observed that the Pickering foam exhibits similar characteristics as the control.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   providing a composition comprising:
      a base liquid; and
      solid particles, wherein the solid particles have a d50 particle size ranging from about 10 nm to about 100 µm;
   foaming the composition with a gas to produce a foamed drilling fluid;
   wherein the foamed drilling fluid is characterized as a Pickering foam, wherein at least 95% of the solid particles are dispersed on an interface between the base liquid and the gas to stabilize the Pickering foam;
   circulating the foamed drilling fluid though a drill string and annulus; and
   extending a wellbore through a subterranean formation.

2. The method of claim 1 wherein the base liquid comprises an aqueous fluid.

3. The method of claim 1 wherein the solid particles comprise at least one solid particle selected from the group consisting of amorphous silica, microcrystalline silica, silica flour, and silica fume, titanium, crystalline nano cellulose, chitin, lignin, lignocellulosic materials, fly ash, and combinations thereof.

4. The method of claim 1 wherein the solid particles are present in an amount ranging from about 0.05 ppg to about 3 ppg based on a total volume of the base liquid.

5. The method of claim 1 wherein the gas is selected from the group consisting of air, nitrogen, and combinations thereof.

6. The method of claim 1 wherein the foamed drilling fluid has a foam quality at a point in a range of about 90% to about 99%.

7. The method of claim 1 wherein the foamed drilling fluid has less than about 5% by volume breakout in quiescent storage at atmospheric pressure and 21° C. for a period of about 1 day or longer.

8. The method of claim 1 wherein the foamed drilling fluid has a density of about 838.8 kg/m$^3$ to about 2397 kg/m$^3$.

9. A method comprising:
mixing a drilling fluid in a mixer, wherein the drilling fluid comprises:
a base liquid; and
solid particles comprising silica;
wherein the solid particles have a d50 particle size ranging from about 10 μm to about 100 μm;
conveying the drilling fluid to a foaming unit;
introducing a gas into the drilling fluid to produce a foamed drilling fluid, wherein the foamed drilling fluid is characterized as a Pickering foam wherein at least about 95 wt. % or more of the solid particles are dispersed on an interface between the base liquid the gas;
circulating the foamed drilling fluid though a drill string and annulus; and
extending a wellbore through a subterranean formation.

10. The method of claim 9 wherein the base liquid comprises an aqueous fluid.

11. The method of claim 9 wherein the solid particles further comprise at least one solid particle selected from the group consisting of amorphous titanium, crystalline nano cellulose, chitin, lignin, lignocellulosic materials, fly ash, and combinations thereof.

12. The method of claim 9 wherein the solid particles are present in an amount ranging from about 0.05 ppg to about 3 ppg based on a total volume of the base liquid.

13. The method of claim 9 wherein the gas is selected from the group consisting of air, nitrogen, and combinations thereof.

14. The method of claim 9 further comprising:
recovering the foamed drilling fluid from the annulus, wherein the foamed drilling fluid recovered from the annulus comprises well cuttings; and
removing at least a portion of the well cuttings from the foamed drilling fluid recovered from the annulus to produce a cleaned foamed drilling fluid.

15. The method of claim 14 further comprising monitoring at least one property of the foamed drilling fluid recovered from the annulus wherein the at least one property is gel strength, density, bubble size, foam elasticity, and combinations thereof.

16. The method of claim 15 further comprising adjusting the at least one property in response to the step of monitoring prior to the step of circulating.

17. A drilling fluid comprising:
a base liquid;
a gas entrained in the base liquid; and
solid particles, wherein the solid particles have a d50 particle size ranging from about 10 μm to about 100 μm;
wherein the drilling fluid is a foamed drilling fluid in the form of a Pickering foam having a foam quality ranging from about 90% to about 99%, wherein at least 95% of the solid particles are dispersed on an interface between the base liquid and the gas to stabilize the Pickering foam.

18. The drilling fluid of claim 17 wherein the solid particles comprise at least one solid particle selected from the group consisting of amorphous silica, microcrystalline silica, silica flour, and silica fume, titanium, crystalline nano cellulose, chitin, lignin, lignocellulosic materials, fly ash, and combinations thereof.

19. The drilling fluid of claim 17 wherein the solid particles are present in an amount ranging from about 0.05 ppg to about 3 ppg based on a total volume of the base liquid, and wherein at least 95% of the solid particles are dispersed on the interface.

* * * * *